United States Patent
Memon et al.

(10) Patent No.: US 9,740,514 B1
(45) Date of Patent: Aug. 22, 2017

(54) METHOD AND SYSTEM TO SHARE DATA WITH SNAPSHOTS IN A VIRTUALIZATION ENVIRONMENT

(71) Applicant: Nutanix, Inc., San Jose, CA (US)

(72) Inventors: Tabrez Memon, Santa Clara, CA (US); Brian Byrne, San Jose, CA (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 599 days.

(21) Appl. No.: 13/928,097

(22) Filed: Jun. 26, 2013

(51) Int. Cl.
*G06F 9/455* (2006.01)

(52) U.S. Cl.
CPC ................. *G06F 9/45533* (2013.01)

(58) Field of Classification Search
CPC ............. G06F 9/45533; G06F 9/45558; G06F 9/5077; G06F 9/5016
See application file for complete search history.

(56) References Cited

U.S. PATENT DOCUMENTS

| | | | |
|---|---|---|---|
| 7,979,395 B1 | 7/2011 | Aggarwal et al. | |
| 8,135,930 B1 | 3/2012 | Mattox et al. | |
| 8,151,263 B1 | 4/2012 | Venkitachalam et al. | |
| 8,364,858 B1 | 1/2013 | Martin et al. | |
| 8,601,473 B1 | 12/2013 | Aron et al. | |
| 8,656,386 B1 * | 2/2014 | Baimetov | G06F 9/45558 709/219 |
| 8,762,967 B2 * | 6/2014 | Kim | G06F 8/61 717/140 |
| 8,850,130 B1 | 9/2014 | Aron et al. | |
| 9,009,106 B1 | 4/2015 | Aron et al. | |
| 9,069,708 B2 | 6/2015 | Gill et al. | |
| 2004/0143832 A1 | 7/2004 | Yamamoto et al. | |
| 2005/0055603 A1 | 3/2005 | Soran et al. | |
| 2007/0074208 A1 * | 3/2007 | Ling | G06F 9/45558 718/1 |
| 2007/0079298 A1 | 4/2007 | Tian | |
| 2007/0174915 A1 | 7/2007 | Gribble et al. | |
| 2007/0244938 A1 | 10/2007 | Michael et al. | |
| 2008/0052331 A1 | 2/2008 | Ogawa et al. | |
| 2008/0065854 A1 | 3/2008 | Schoenberg et al. | |
| 2008/0115143 A1 | 5/2008 | Shimizu et al. | |
| 2008/0244028 A1 * | 10/2008 | Le | G06F 3/0607 709/208 |

(Continued)

OTHER PUBLICATIONS

Non-final Office Action dated Jun. 4, 2015 for related U.S. Appl. No. 13/926,921.

(Continued)

*Primary Examiner* — James J Lee
(74) *Attorney, Agent, or Firm* — Vista IP Law Group, LLP

(57) ABSTRACT

Disclosed is an improved approach to optimize link-based cloning in a virtualization architecture. In some approaches, each of the remote nodes is allowed to maintain its own snapshot of the linked/shared image. In this way, the processing power of each remote node can be used in a decentralized manner to administratively handle access to the shared data, rather than requiring the CPU resources of only the host node to centrally handle administrative access to the data. In addition, each of nodes can maintain copies of the shared image in a local cache. This allows the caching resources to also be decentralized, as each of the nodes can use its own caching resources to hold the shared data.

21 Claims, 24 Drawing Sheets

(56) References Cited

U.S. PATENT DOCUMENTS

| | | | |
|---|---|---|---|
| 2009/0125678 | A1 | 5/2009 | Tokuda et al. |
| 2009/0260007 | A1* | 10/2009 | Beaty .................... G06F 9/5077 718/1 |
| 2010/0011178 | A1 | 1/2010 | Feathergill |
| 2010/0077165 | A1 | 3/2010 | Lu et al. |
| 2010/0162242 | A1 | 6/2010 | Grouzdev |
| 2011/0047340 | A1 | 2/2011 | Olson et al. |
| 2011/0154378 | A1 | 6/2011 | Kishan et al. |
| 2011/0307531 | A1 | 12/2011 | Gaponenko et al. |
| 2012/0005668 | A1* | 1/2012 | Serizawa ............ G06F 12/0866 718/1 |
| 2012/0117299 | A1 | 5/2012 | Waldspurger |
| 2012/0144391 | A1* | 6/2012 | Ueda .................... G06F 9/45558 718/1 |
| 2012/0167082 | A1* | 6/2012 | Kumar ................. G06F 9/4555 718/1 |
| 2012/0188592 | A1 | 7/2012 | Handley |
| 2012/0331462 | A1* | 12/2012 | Falko ................. G06F 9/45533 718/1 |
| 2013/0179574 | A1 | 7/2013 | Calder et al. |
| 2013/0198489 | A1 | 8/2013 | Branson et al. |
| 2013/0227558 | A1 | 8/2013 | Du |
| 2014/0195753 | A1 | 7/2014 | Khatri et al. |
| 2014/0229949 | A1 | 8/2014 | Cai |
| 2014/0282824 | A1 | 9/2014 | Lango et al. |
| 2014/0317265 | A1 | 10/2014 | James et al. |
| 2014/0325170 | A1 | 10/2014 | Aswathanarayana et al. |
| 2014/0365740 | A1 | 12/2014 | Vasilyev et al. |
| 2015/0180714 | A1 | 6/2015 | Chunn |
| 2015/0188775 | A1 | 7/2015 | Van Der Walt |
| 2015/0248402 | A1 | 9/2015 | Patterson, III |
| 2016/0202916 | A1 | 7/2016 | Cui et al. |
| 2016/0203013 | A1 | 7/2016 | Bayapuneni et al. |

OTHER PUBLICATIONS

Final Office Action dated Dec. 22, 2015 for related U.S. Appl. No. 13/926,921.
International Search Report and Written Opinion dated May 30, 2014 for related PCT Patent Application No. PCT/US13/78389.
Non-final Office Action dated Mar. 12, 2015 for related U.S. Appl. No. 13/918,660.
Final Office Action dated Aug. 31, 2015 for related U.S. Appl. No. 13/918,660.
International Search Report and Written Opinion dated Jun. 22, 2015 for related PCT Patent Application No. PCT/US2015/020144.
Non-final Office Action dated Sep. 28, 2015 for related U.S. Appl. No. 14/206,924.
Final Office Action dated May 19, 2016 for related U.S. Appl. No. 14/206,924.
Non-final Office Action dated Jun. 3, 2016 for related U.S. Appl. No. 14/278,429.
Non-final Office Action dated Jun. 7, 2016 for related U.S. Appl. No. 13/918,660.
Advisory Action dated Aug. 5, 2016 for related U.S. Appl. No. 14/206,924.
Non-final Office Action dated Aug. 11, 2016 for related U.S. Appl. No. 13/926,921.
Final Office Action dated Oct. 3, 2016 for related U.S. Appl. No. 13/918,660.
Xiao, et al., "Implementaion and Performance Evaluation of Two Snapshot Methods on iSCSI Target Storages", 2006, 11 pages.
Xiv Storage Reinvented, Snapshots Reinvented IBM XIV Storage System, Copyright IBM Corporation 2008, 17 pages.
Pai, Vivek, "COS 318: Operation Systems Snapshot and NFS", Computer Science Department, Princeton University, 2011, 24 pages.
Agarwal, et al., "Snapshots in Hadoop Distributed File System", 2011, 5 pages.
Navarro, et al., "FuSnap: Fuzzy Control of Logical Volume Snapshot Replication for Disk Arrays", Copyright 2010, 9 pages.
Sankaran et al., "Volume Shadow Copy Service", Storage Environment, Power Solutions, Mar. 2004, 4 pages.
"CA ARCserve Backup for Windows", Microsoft Volume Shadow Copy Service Guide r15, Copyright 2010.
Overland Storage, "Hardware Provider for Microsoft Volume Shadow Copy Service (VSS) User Guide", Ultamus Raid, Copyright 2008, 20 pages.
IBM, "IBM XIV Provider for Microsoft Windows Volume Shadow Copy Service" Version 2.4.0, Release Notes, Copyright 2009, 2013, 18 pages.
Fujitsu Limited, "VSS Backup Solution for Exchange Server 2007 and Symantec Backup Exec 12.5 using ETERNUS VSS Hardware Provider" System Configuration Guide, Copyright 2009, 45 pages.
Final Office Action dated Nov. 30, 2016 for related U.S. Appl. No. 14/278,429.
Notice of Allowance and Fee(s) due dated Jan. 25, 2017 for related U.S. Appl. No. 13/918,660.
Final Office Action dated Mar. 2, 2017 for related U.S. Appl. No. 13/926,921.
Notice of Allowance dated Mar. 9, 2017 for related U.S. Appl. No. 14/278,429.
Advisory Action dated May 25, 2017 for related U.S. Appl. No. 13/926,921.

\* cited by examiner

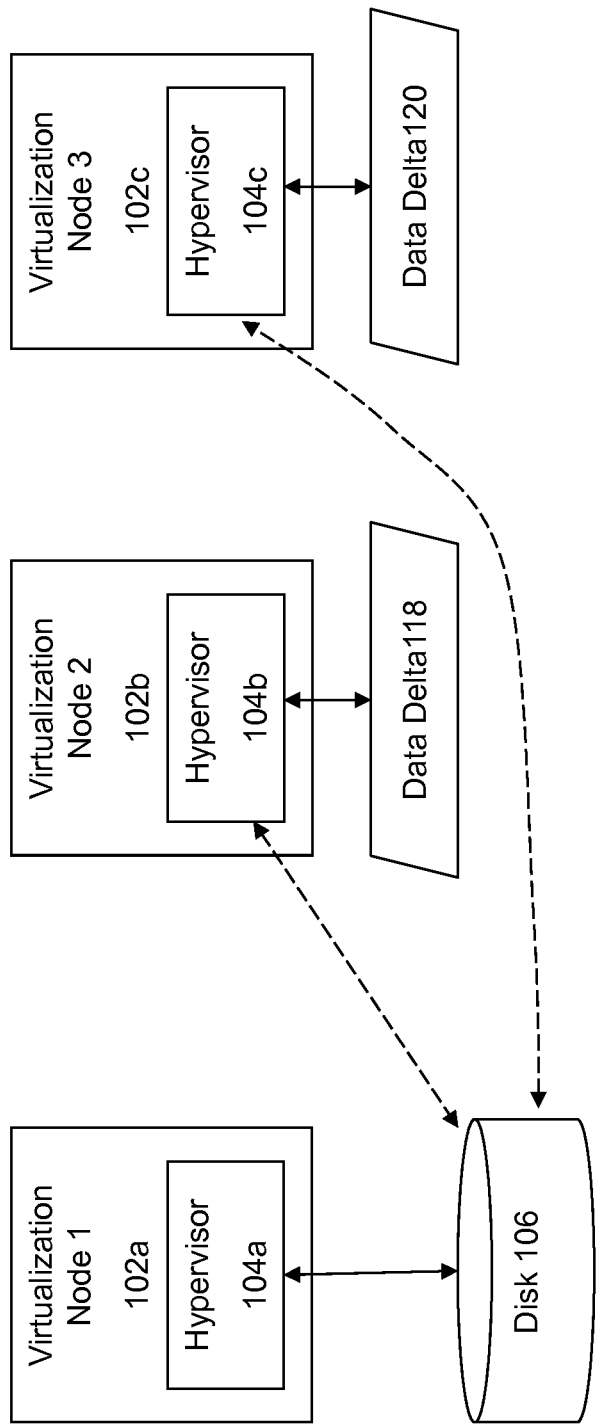

METHOD AND SYSTEM TO SHARE DATA WITH SNAPSHOTS IN A VIRTUALIZATION ENVIRONMENT

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

To illustrate, consider the scenario where it may be desirable to use virtualization to provide the same base disk image to a large number of users. For example, a public library may seek to provide access to computers for members of the general public. In this situation, where random users may walk off the street to access the shared computers, there is no need to customize the computers that are accessible to the public. Instead, virtualization can be utilized to display the same base image (e.g., selected operating system/desktop and applications) on each of the computers accessible to the members of the public.

"Cloning" is common approach that can be taken to allow the same base image to be used by multiple virtualization computing nodes. FIG. 1A illustrates this situation, where a virtual disk 106 may include a base image that is utilized by one or more virtualization nodes in the system. Each of the virtualization nodes includes a hypervisor to implement the virtualization functionality. Here, a first virtualization node 1 includes a hypervisor 104a that allows it to access a base image on a disk 106.

Consider if there are other virtualization nodes 2 and 3 that also seek to use the base image on virtual disk 106. One possible approach is to allow "full clones" of the base image to be created for each of the other virtualization nodes. Thus, as shown in FIG. 1B, a fully cloned disk 108 will be created for virtualization node 2 and another fully cloned disk 110 will be created or virtualization node 3. The problem with this approach is that it is a very heavyweight approach, with very expensive resource consumption requirements.

Another possible approach is to allow the virtualization nodes to link to a common base image. FIG. 1C illustrates this approach, which is often termed the "linked clone" or the "link-based clone" approach. Here, a full clone is not created for each of the virtualization node. Instead, link-based clones are implemented that allow the virtualization nodes to link to the single copy of the virtual disk 106 that exists in the system. To the extent that any of the virtualization nodes need to make any changes to the data (creating a "delta" between the base image and the current data set viewed at the node), then local delta disk 118/120 is maintained at the remote nodes 2 and 3, respectively, that track the delta between the base image and the corresponding local view of the base image.

In the approach of FIG. 1C, it is noted that access to the linked base image can be directly provided to the local hypervisors, or may be routed through the hypervisor that resides at the host node for the base image. The possible problem with this linked clone approach is a bottleneck may result from having each of the remote virtualization nodes 2 and 3 needing to go through a host node 1 to access the base image at disk 106. The bottleneck occurs because the resources of the host node (e.g., memory and CPU resources) are used to access the locally controlled base image on behalf of the remote nodes. In some circumstances, a "bootstorm" may result when all of the remote nodes need to hit the same shared image at the same time, e.g., in the morning when an organization/company first opens for business as all users seek to boot up at the same time. This situation can cause great delays, resulting in excessive periods of unproductive time while remote nodes are queued up to access the same shared image.

Therefore, there is a need for an improved approach to implement access to a shared image in a virtualization environment.

SUMMARY

Embodiments of the invention provide for a method and mechanism for optimizing link-based cloning in a virtualization architecture. In some embodiments, each of the remote nodes is allowed to maintain its own snapshot of the linked/shared image. The snapshots are not full copies of the data, but are instead metadata content that point to the actual data on the virtual disk. The individual snapshots are administered by corresponding nodes that own the snapshots. In this way, the processing power of each remote node (e.g., CPU processing resources) can be used in a decentralized manner to administratively handle access to the shared data, rather than requiring the CPU resources of only the host node to centrally handle administrative access to the data.

In addition, each of nodes can maintain copies of the shared image in a local cache. This allows the caching resources to also be decentralized, as each of the nodes can use its own caching resources to hold the shared data. Also, local caching reduces the need to constantly retrieve the shared data from the linked virtual disk at the host node.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 1C illustrate link-based cloning.

DETAILED DESCRIPTION OF THE EMBODIMENTS OF THE INVENTION

The present disclosure provides an improved approach to implement cloning in a virtualization environment. As noted above, cloning approaches that use linking suffer from performance bottlenecks that result from requiring multiple remote nodes to employ the resources of the node that hosts the local disk holding the shared image. These problems relate, for example, to CPU and memory/cache resources on the host node that become overloaded when handling multiple data requests from the remote nodes, particularly during periods of time when high numbers of requests are received.

In some embodiments, these problems are addressed by allowing each of the remote nodes to maintain its own snapshot of the linked/shared image. The snapshots are not full copies of the data, but are instead metadata content that point to the actual data on the virtual disk. The individual snapshots are administered by corresponding nodes that own the snapshots. In this way, the processing power of each remote node (e.g., CPU processing resources) can be used in a decentralized manner to administratively handle access to the shared data, rather than requiring the CPU resources of only the host node to centrally handle administrative access to the data.

In addition, each of nodes can maintain copies of the shared image in a local cache. This allows the caching resources to also be decentralized, as each of the nodes can use its own caching resources to hold the shared data. Also, local caching reduces the need to constantly retrieve the shared data from the linked virtual disk at the host node.

The approach is particularly useful in a virtualization environment where individual nodes control access to resources "owned" by that node. One way to implement this type of virtualization environment is to use a controller/service virtual machine or VM (hereinafter referred to as a "Service VM") to control and manage storage devices, including direct-attached storage in addition to network-attached and cloud-attached storage. The Service VM implements the storage controller logic in the user space, and with the help of other Service VMs in a cluster, virtualizes all storage hardware as one global resource pool. An example approach to implement service VMs and related virtualization architecture components is described in U.S. patent application Ser. No. 13/207,345, filed on Aug. 10, 2011, which is hereby incorporated by reference in its entirety.

Figure 1A:
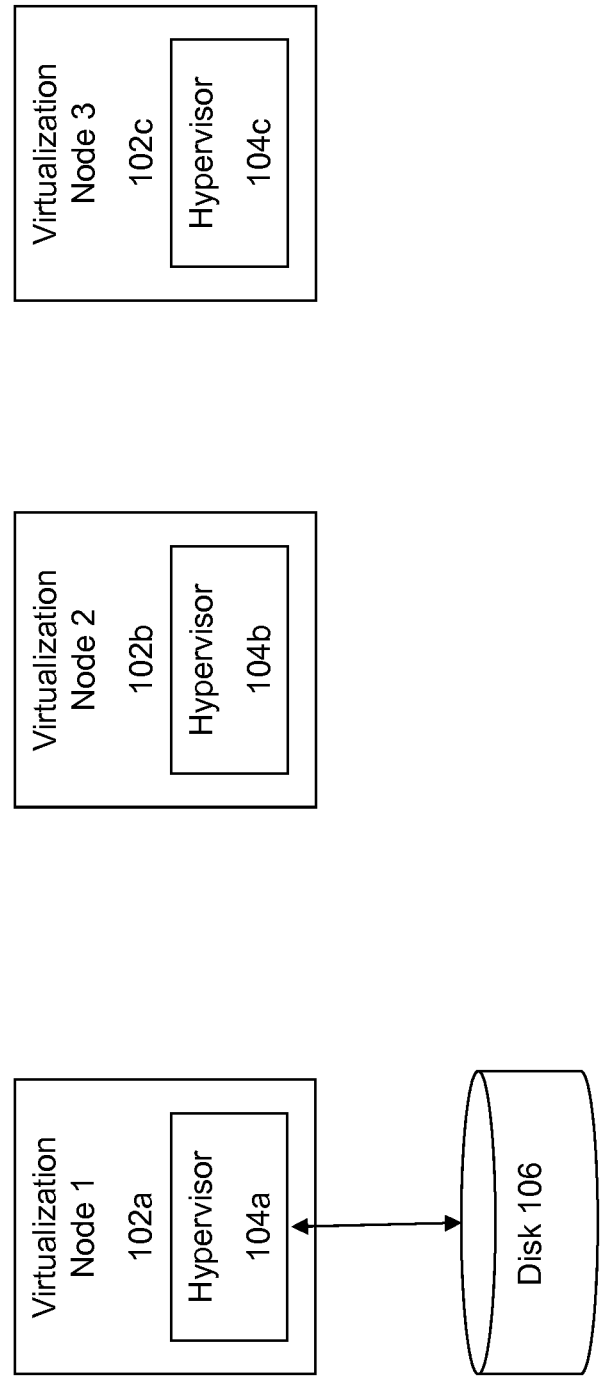
FIG. 1A illustrates where a virtual disk include a base image that is utilized by one or more virtualization nodes in the system.
Figure 1B:
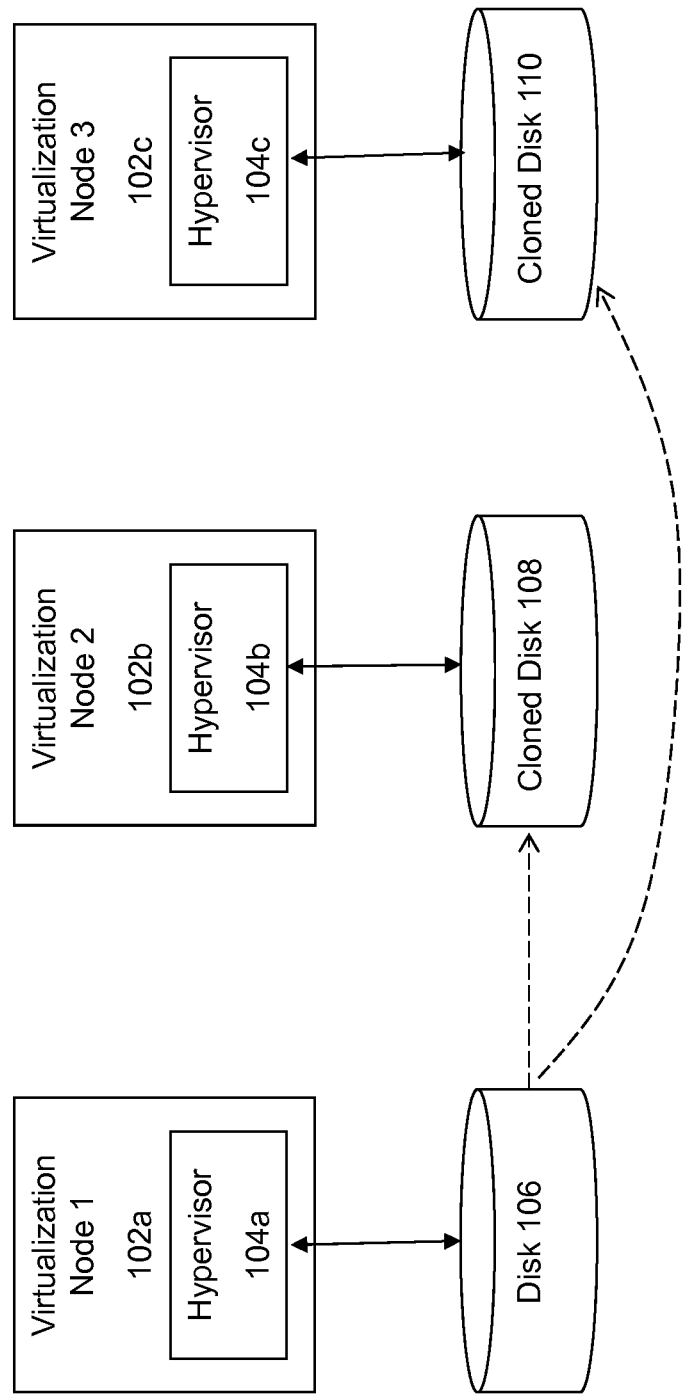
FIG. 1B illustrate full cloning.
Figure 2A:
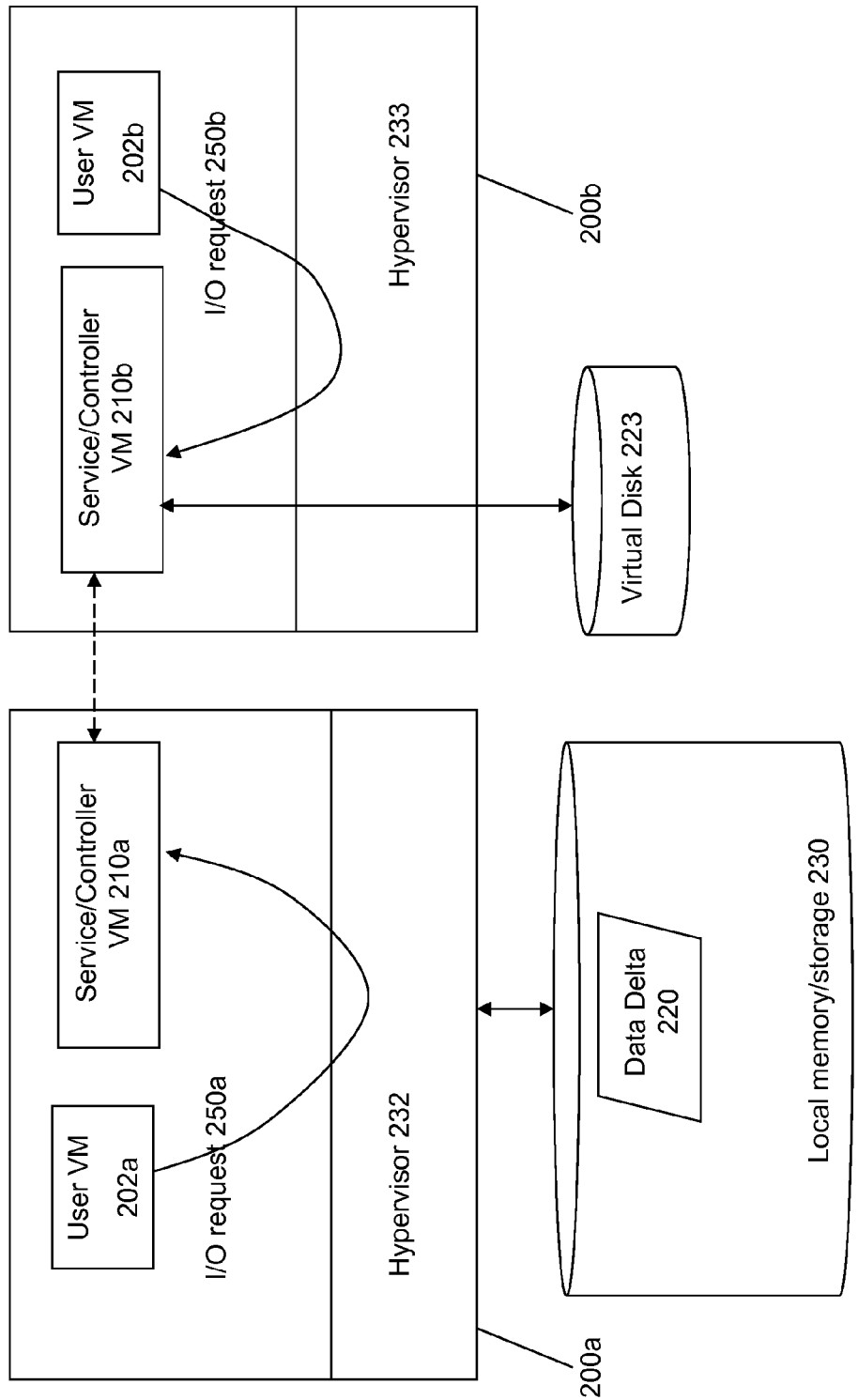
FIG. 2A illustrates an architecture for implementing storage management in a virtualization environment according to some embodiments of the invention.

FIG. 2A illustrates an architecture for implementing storage management in a virtualization environment according to some embodiments of the invention. This figure shows two nodes 200a and 200b. Each node 200a or 200b runs virtualization software, such as VMware ESX(i), Microsoft Hyper-V, or RedHat KVM. The virtualization software includes a hypervisor 232/233 to manage the interactions between the underlying hardware and the one or more user VMs 202a/202b.

The service VMs 210a/210b manage storage and I/O activities and functions as a storage controller. Multiple such storage controllers coordinate within a cluster to form a single-system. The service VMs 210a/210b are not formed as part of specific implementations of hypervisors 232/233. Instead, the Service VMs run as virtual machines above hypervisors 232/233 on the various server nodes 200a and 200b, and work together to form a distributed system that manages all the storage resources, including the locally attached storage, networked storage, and cloud storage. Since the Service VMs run above the hypervisors 232/233, this means that the approach can be used and implemented within any virtual machine architecture, since the Service VMs of embodiments of the invention can be used in conjunction with any hypervisor from any virtualization vendor.

Each Service VM exports one or more block devices or NFS server targets that appear as disks to the user VMs. These disks are virtual, since they are implemented by the software running inside the Service VMs. Thus, to the user VMs, the Service VMs appear to be exporting a clustered storage appliance that contains some disks. All user data (including the operating system) in the client VMs resides on these virtual disks.

This creates a distributed platform that contains multiple servers 200a and 200b that manages multiple-tiers of storage. The multiple tiers of storage include storage that is accessible through a network, such as cloud storage or networked storage (e.g., a SAN or "storage area network"). The architecture also permits local storage that is within or directly attached to the server and/or appliance to be managed as part of the storage pool. Examples of such storage include Solid State Drives (henceforth "SSDs") or Hard Disk Drives (henceforth "HDDs" or "spindle drives"). Virtual disks (or "vDisks") can be structured from the storage devices in the storage pool.

The shared virtual disk 223 can be accessed by multiple user VMs on different server nodes 200a and 200b. However, the virtual disk 223 is administratively "owned" by the service VM 210b on server node 200b. This means that service VM 210b is used to perform the actual read and write operations for its hosted storage objects, such as virtual disk 223. Therefore, all I/O requests for virtual disk 223 will be directed to service VM 210b, e.g., by using standard IP forwarding (Network Address Translation) rules in the networking stack of the service VMs.

For I/O requests 250b from a user VM 202b that resides on the same server node 200b, the process to handle the I/O requests 250b is straightforward. Essentially, the I/O request is in the form of an iSCSI or NFS request that is directed to a given IP address. The IP address for the I/O request is common for all the service VM on the different server nodes, but VLANs allows the IP address of the iSCSI or NFS request to be private to a particular (local) subnet, and hence the I/O request 250b will be sent to the local service VM 210b to handle the I/O request 250b. Since local service VM 210b recognizes that it is the owner of the virtual disk 223 which is the subject of the I/O request 250b, the local Service VM 210b will directly handle the I/O request 250b.

Consider the situation if a user VM 202a on a remote server node 200a issues an I/O request 250a for the shared disk 223, where the shared virtual disk 223 is owned by a service VM 210b on a different server node 200b. This situation occurs, for example, when linked cloning is employed such that the data is located at the virtual disk 223, but usage at node 200a involves linking to that data on shared virtual disk 223. Any changes to the data is locally stored at data delta 220 in local storage 230, but all other requests for the shared is directed to the virtual disk 223.

In this situation, the I/O request 250a is sent from the user VM 202a to its local service VM 210a on remote node 200a. However, the service VM 210a will recognize that it is not the owner of the shared virtual disk 223. Instead, the service VM 210a will recognize that service VM 210b is the owner of the shared virtual disk 223. Therefore, the I/O request will be forwarded from service VM 210a to service VM 210b so that the owner (service VM 210b) can use its processing resources to handle the forwarded I/O request (e.g, to retrieve requested data from the linked-cloned image on virtual disk 223).

As noted above, this approach may result in performance problems if there are multiple remote nodes that are all need to have service VM 210a act on their behalf at the same time. This is because the CPU and memory resources of the host node 200b could be overloaded attempting to service requests from remote nodes for the shared virtual disk 223, such as request 250a from remote node 200a.

In some embodiment of the invention, "snapshots" are created at each of the nodes for the shared data to address the above-described problems with linked clones. In the computer science field, a "snapshot" is a term that is used to refer to the state of a set of data at a particular point in time. There are many reasons to implement snapshots of different data. For example, it is often desirable to implement snapshots of an entire disk drive. The snapshot of the disk drive may be useful, for example, to permit distribution and/or backup of a consistent disk image across many devices in a given system or computing environment.

Figure 2B:
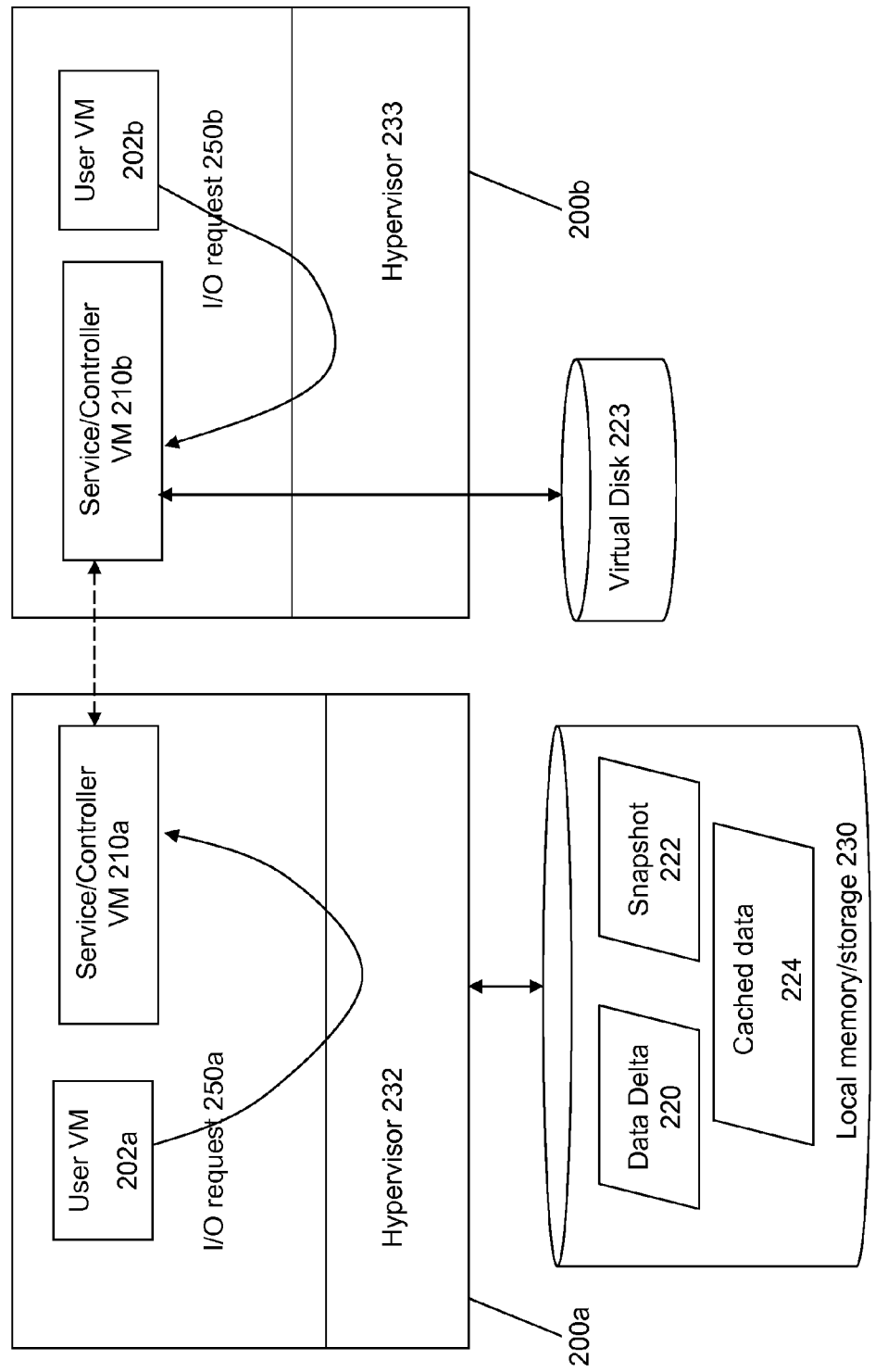
FIG. 2B illustrates an embodiment of the invention.

FIG. 2B illustrates this concept. Here, a snapshot 222 has been created on remote node 200a which relates to the shared data on virtual disk 223. In the present embodiment, the snapshot 222 comprises a set of metadata that corresponds to the shared base image that had been cloned. The metadata therefore provides information that allows the computing system to know about the existence of the new snapshots and their relationship to the underlying data. Further details regarding one approach that can be taken to implement snapshots in a virtualization system is described in U.S. patent application Ser. No. 13/207,371, filed on Aug. 10, 2011, which is hereby incorporated by reference in its entirety.

One advantage provided by this approach is that access by a user VM 202a is administratively controlled by the service VM 210a on node 200a by accessing snapshot 222. This allows the node 200a to use its own processing resources to perform data accesses against snapshot 222, rather than relying upon a forwarded I/O request that must be administratively handled by host node 200b for the virtual disk 223. This effectively decentralizes the resource consumption needed to access a cloned image, even where the cloned data is "linked" to a single shared virtual disk. The snapshots 222 can be created at all (and/or some) of the remote nodes that link to a cloned image.

In addition, once the cloned data has been retrieved from the shared virtual disk 223 and sent to the remote node 200a, the retrieved data can be locally cached at the local memory/storage devices 230. This provides numerous advantages. One advantage is that this approach avoids the need to only utilize the caching resources on the host node 200b, thereby decentralizing caching resources in the system as well. Another advantage is that this approach reduces network overhead, since cached data can be locally provided to user VMs rather than requiring the same data to be repetitively retrieved from the virtual disk 223.

Figure 3:
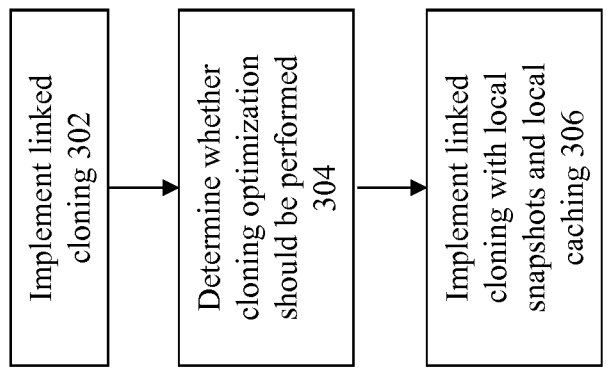
FIG. 3 shows a high level flowchart of an approach to implement some embodiments of the invention.

FIG. 3 shows a high level flowchart of an approach to implement some embodiments of the invention. At 302, cloning is implemented for an identified item or set of data. For the present embodiment, link-based cloning is implemented for the data, instead of creating full clones. In some embodiments, this may be implemented using the "linked clone" approach provided by the VMWare virtualization product, where a "View" management console is used to administer the linked clones.

At 304, a determination is performed as to whether the type of data being cloned is suitable for the optimization of the present invention. Certain types of data are not optimally suited for the optimizations implemented by the invention. For example, data that are not often accessed by remote nodes would be less suitable candidates for the invention.

At 306, the optimization of the present invention is performed for the identified data. This action is performed by creating local snapshots of the linked data at the remote nodes. In addition, local caching is used to cache the linked data at the remote nodes.

Figure 4:
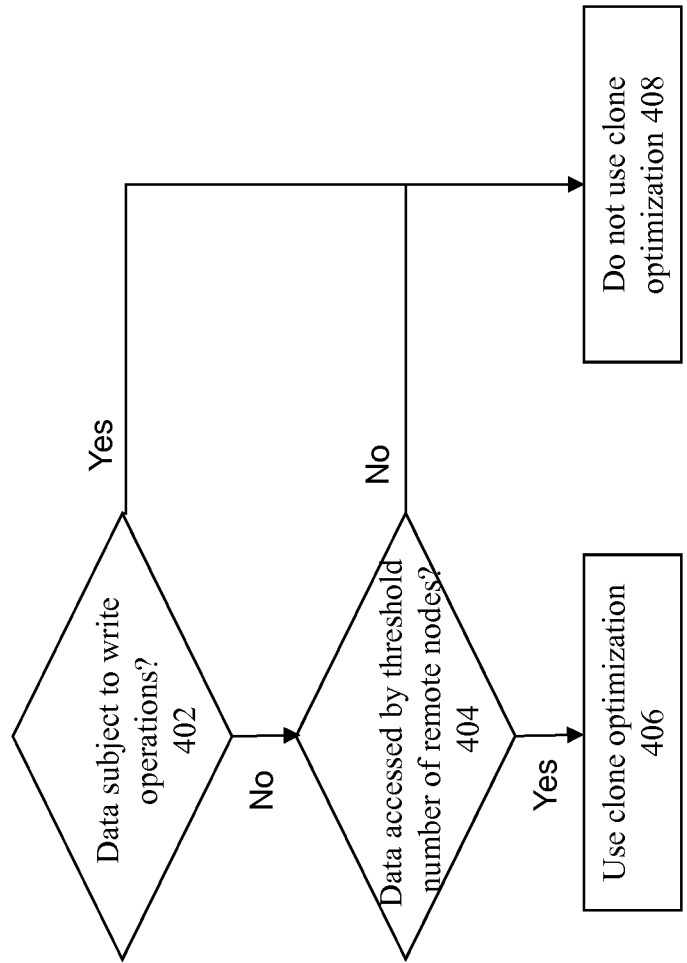
FIG. 4 shows a flowchart of an approach for determining whether a cloned data item or set of data is a candidate for the inventive optimization according to some embodiments.

FIG. 4 shows a flowchart of an approach for determining whether a cloned data item or set of data is a candidate for the inventive optimization according to some embodiments. At 402, a check is made whether the linked data at the shared disk is subject to writes. If the data is subject to write operations, then the present optimization is not performed (408). If the linked data is not subject to write operations, then it is eligible for the present optimization (406).

With link-base cloning in the present embodiment, any write operations by the remote nodes are made to a local set of delta data, rather than to the shared/linked image at the shared disk. Therefore, this criteria is met for the linked clone situation.

At 404, a determination is made whether the data is to be accessed by a threshold number of remote nodes. If the data is only accessed locally on the host node, then there is no need for the optimization. On the other hand, identifying a significant number of remote nodes that need to access the shared/linked data indicates a possibility that a bottleneck may exist when the shared/linked data is hosted by a single node.

Any suitable number can be selected as the threshold in 404 for determining whether the optimization is to be performed. In some embodiments, identification of even a single remote node that needs to access the cloned data (Remote_Sessions>1) is sufficient to warrant the optimization. In other embodiments, multiple remote sessions above a given threshold is needed before applying the optimization.

Figure 5:
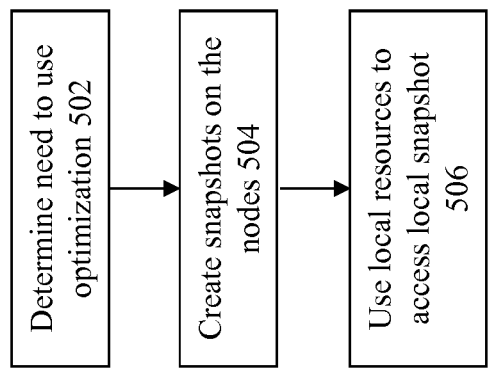
FIG. 5 shows a flowchart of an approach to implement the link-based clone optimization according to some embodiments of the invention.

FIG. 5 shows a flowchart of an approach to implement the link-based clone optimization according to some embodiments of the invention. At 502, the process receives instructions to perform the optimization. This instruction may result, for example, from a determination made according to the flow of FIG. 4.

At 504, snapshots are created at the various nodes. This action can be performed, for example, by instructing the service VMs at each node to create a snapshot corresponding to the shared/cloned data. In some embodiments, the host node for the shared virtual disk also creates a snapshot. In this way, every node (including the host node) will consistently access its local snapshot instead of directly attempting to access the original cloned data on the shared virtual disk. In an alternative embodiment, the host node does not need to create its own snapshot.

At 506, the local service VM will administer access to the data using the local snapshots. The service VM of the nodes will therefore each use its own processing resources to administer access to the shared data. In addition, local caching resources are used to provide caching for the data.

Figure 6A:
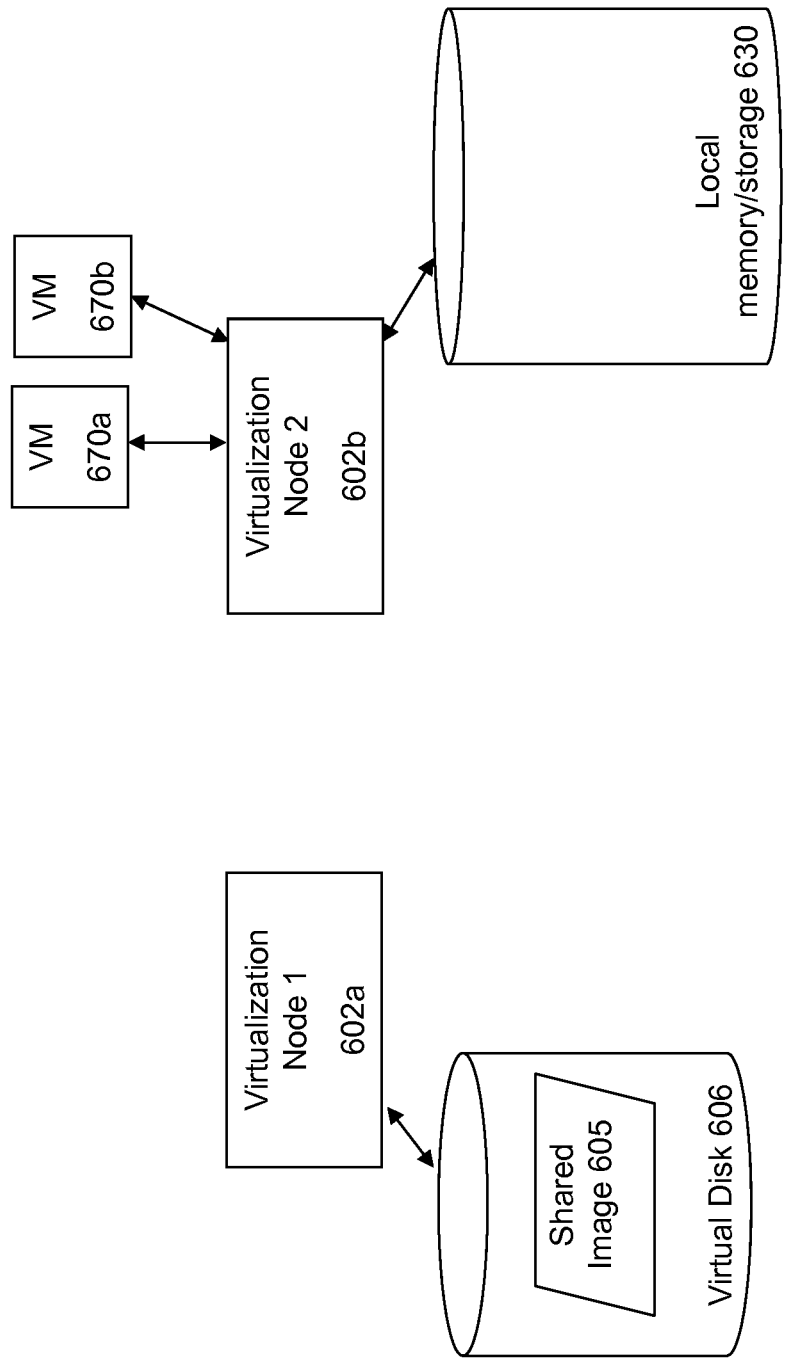
FIGS. 6A-F illustrate the link-based clone optimization according to some embodiments of the invention.

FIGS. 6A-F illustrate the link-based clone optimization according to some embodiments of the invention. FIG. 6A shows a system (e.g., a clustered system) having a first node 602a that is hosting a shared image 605 on a virtual disk 606. A second node 602b is within the system that has local memory/storage 630. Node 602b supports multiple user VMs, such as user VMs 670a and 670b.

It is assumed that linked-based cloning is used to allow node 602b to access shared image 605 on the virtual disk 606. Further assume that a determination has been made that the situation is appropriate for the optimization of the present invention, e.g., by determining that node 602b will not perform any writes to shared image 605 and that a threshold number of remote sessions need to access shared image 605.

Figure 6B:
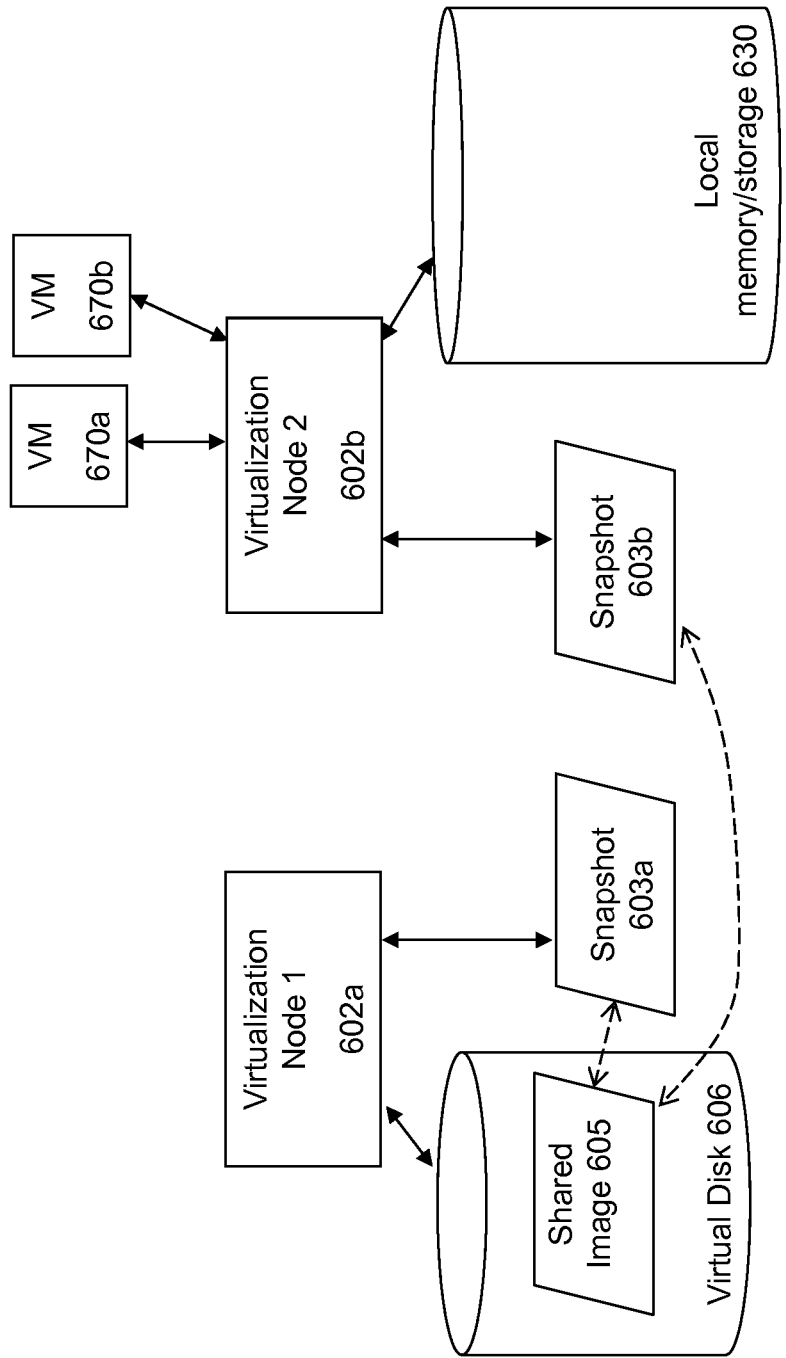

In this situation, each of the nodes will create a snapshot that corresponds to the shared image 605. As shown in FIG. 6B, a local snapshot 603a is created for node 602a. Similarly, a local snapshot 603b is created for node 602b. This allows each local node to use its own service VM to administer access to the local snapshot, which essentially permits local resources to be employed to manage access to the data represented by the local snapshot.

Figure 6C:
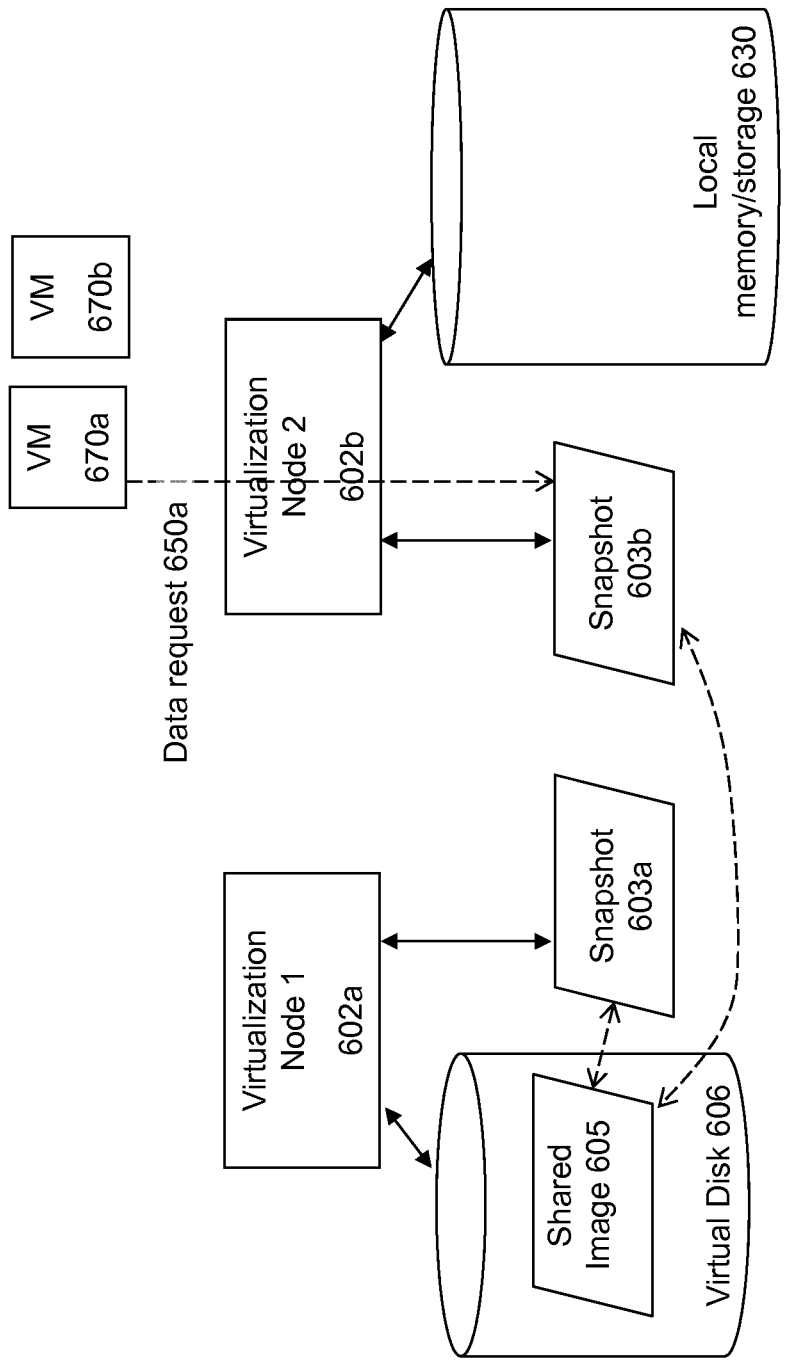

As shown in FIG. 6C, a user VM 670a at node 602b may seek to access the data for shared image 605 (by sending data request 650a). This occurs by having the service VM at node 602b use the local processing resources at node 602b to manage access to local snapshot 603b at that node. In this way, the administrative processing overhead is consumed at node 602b rather than host node 602a (e.g., the CPU resources at node 602b are consumed to manage access to snapshot 603b).

Figure 6D:
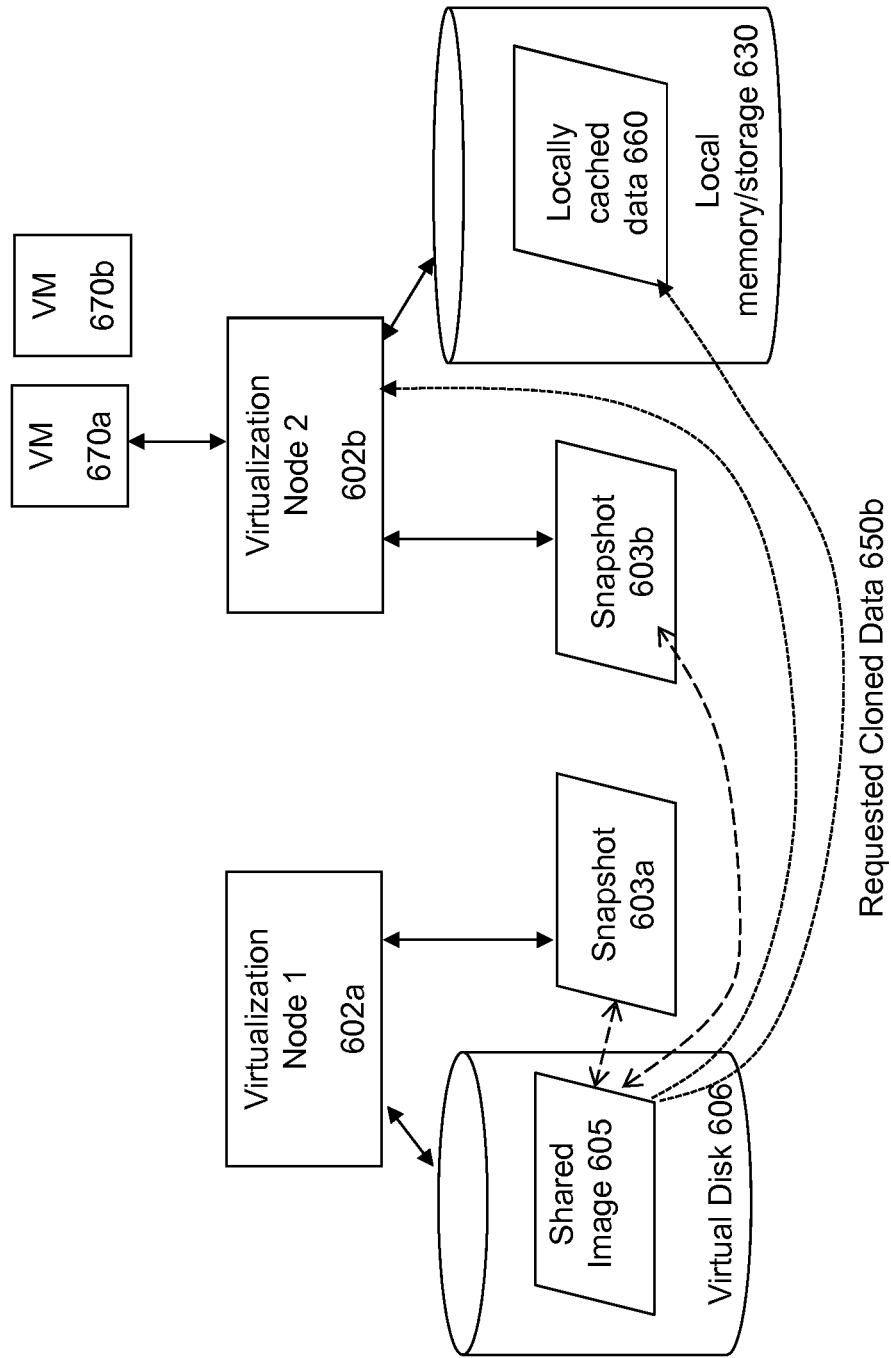

It is possible that the data requested by the user VM 670a will need to be retrieved from the virtual disk 606. As shown in FIG. 6D, if necessary, the data will be retrieved from the virtual disk 606 (data 650b) and sent to the user VM 670a. Once retrieved, that data can be held in local cache 660 at node 630.

Figure 6E:
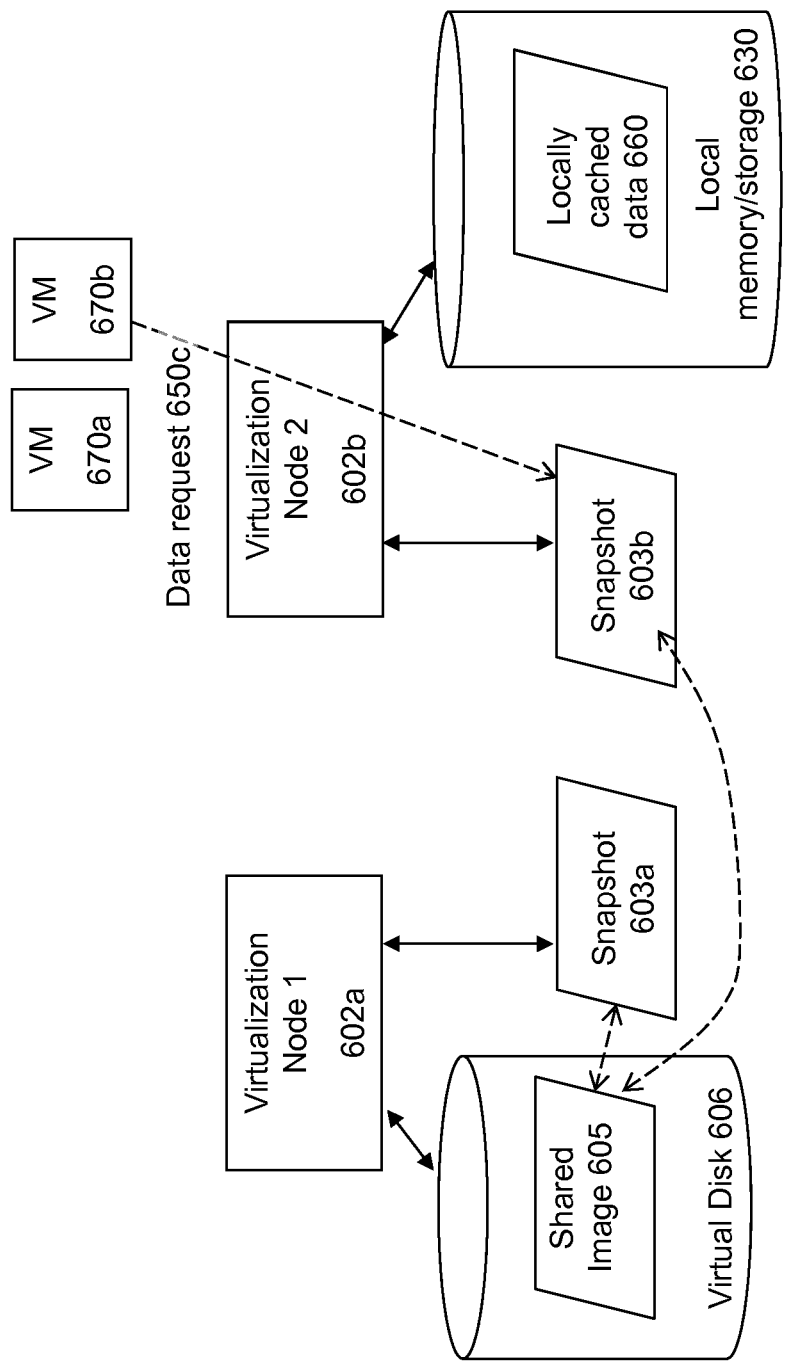
Figure 6F:
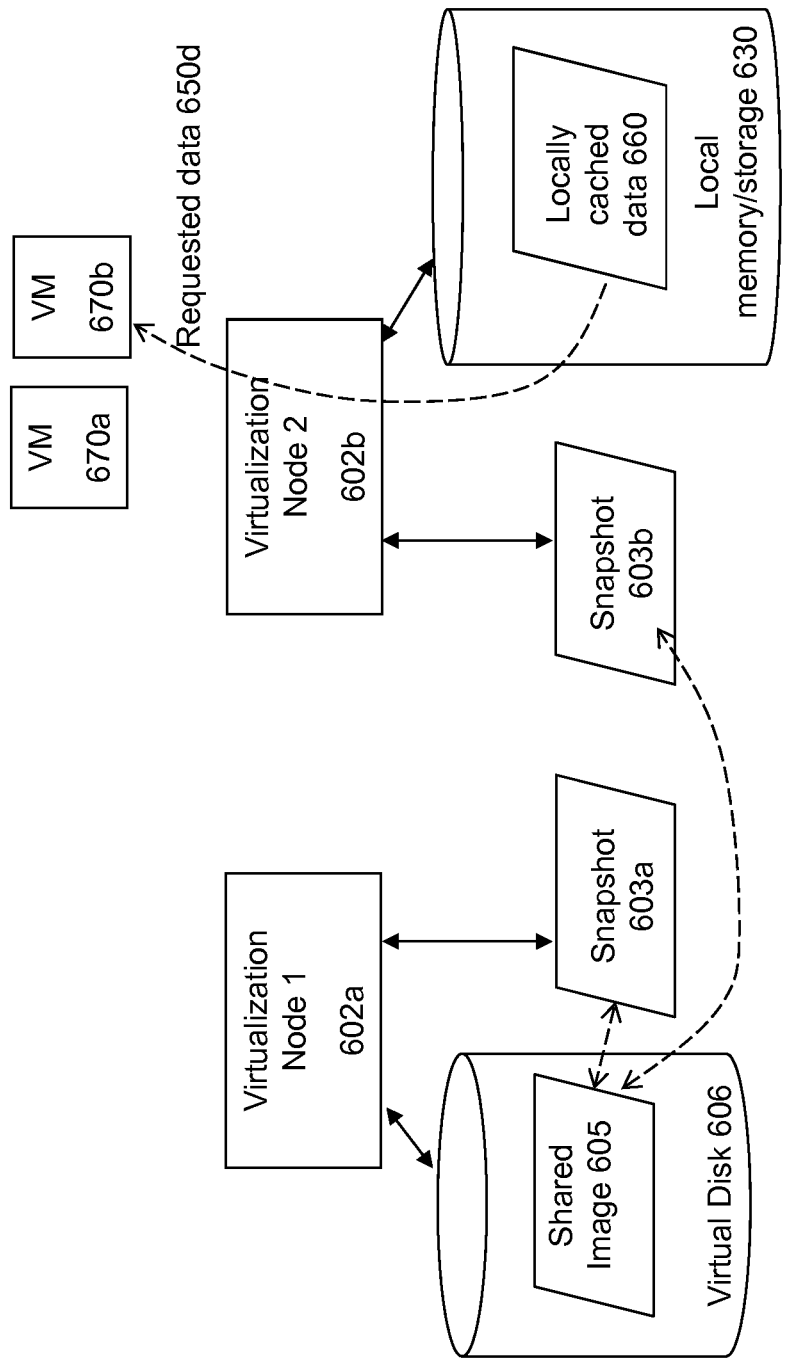

At a later point in time, another user VM 670b may seek to access that same set of data from the shared image 605. As shown in FIG. 6E, the user VM 670b may send a request 650c for the data, where the service VM at node 602b handles the request 650c by using local processing resources at node 602b to manage access to local snapshot 603b.

However, since the data had previously been requested by another user VM, that data may already exist in local cache 660. Therefore, before retrieving the requested data from the remote virtual disk 606, a check is made to see if that same data is already in local cache 660. If so, then the requested data 650d is retrieved from the local cache 660 to be used by the user VM 670b.

It is noted that the present approach is significantly advantageous over traditional ideas of caching, given that shared data is being accessed. With traditional approaches, local caching is often inefficient since complicated concurrency controls must be implemented to prevent inconsistent access/changes to the shared data. With the present approach, local caching is advantageously provided without requiring such complicated concurrency controls. This is because the base image itself is owned by only one of the nodes, and hence is not to be changed by the nodes. Instead, any changes are placed into the local delta data structures.

The cloned data at the virtual disk is not updated or modified by the remote nodes. However, the host node may need to update the image from time to time. This may occur to provide changes, updates, upgrades, or bug fixes to components within the base image.

In the some embodiments of the invention, such updates are implemented by using writable snapshots. In this approach, each new version of the cloned image corresponds to a new snapshot that is used by the various nodes. When an update to the shared image occurs, a new snapshot is correspondingly created for the new image.

Figure 7:
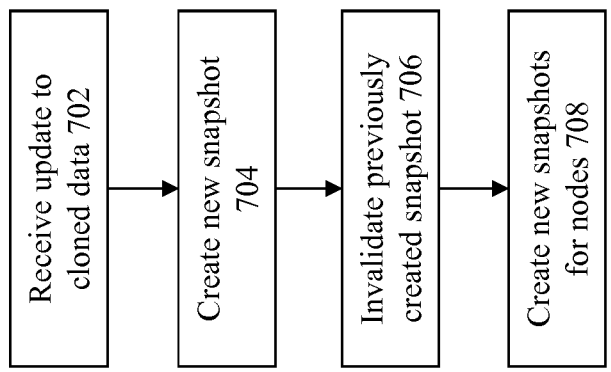
FIG. 7 shows a flowchart of an approach to update a base image according to some embodiments.

FIG. 7 shows a flowchart of this approach according to some embodiments. At 702, an update is received for the cloned data. The update is not an update from one of the nodes that link to the shared data, since any changes to the data for a remote node is placed into a set of delta data. Instead, the change is because of a change to the "golden" version of the shared data image that needs to be made to the shared image data on the virtual disk at the primary host node.

At 704, a new snapshot is created that corresponds to the new/updated image data. One possible approach that can be taken to implement the snapshot is to use writable snapshot technology, an example of which is described in U.S. patent application Ser. No. 13/207,371, filed on Aug. 10, 2011, which is hereby incorporated by reference in its entirety.

At 706, any leases that have been granted to the old version of the snapshot (which corresponds to the old version of the data) will be revoked. This invalidates the prior snapshots that had been established at the various nodes. In effect, this action prevents any future access to the prior version of the local snapshots at the remote nodes.

Thereafter, at 708, new local snapshots are created for the nodes. The process for creating the new local snapshots is performed as previously described above.

Figure 8A:
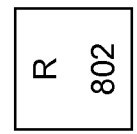
FIGS. 8A-H illustrate a process for updating a base image according to some embodiments of the invention.
Figure 8B:
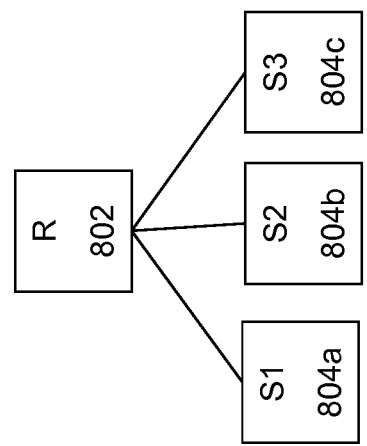
Figure 8C:
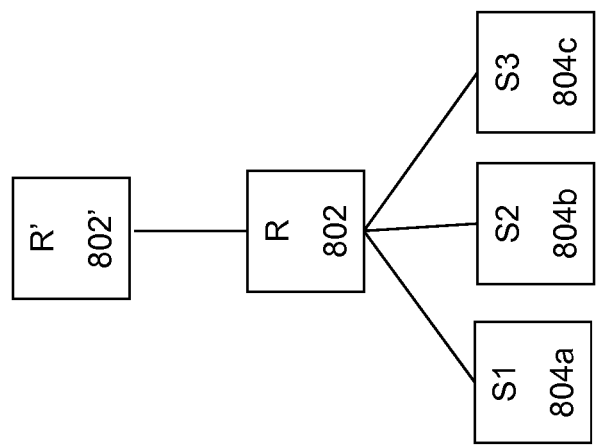

FIGS. 8A-H illustrate this process. FIG. 8A shows a version 802 that has been created for a current version of a base image. The letter "R" refers to a replica of the base image that has been created for the use of the host node (the golden image is not directly used by the host node). Assume that the inventive optimization is performed to implement linked clones of the base image 802. As shown in FIG. 8B, local snapshots 804*a*, 804*b*, and 804*c* are created at remote nodes which correspond to the base image 802.

Figure 8D:
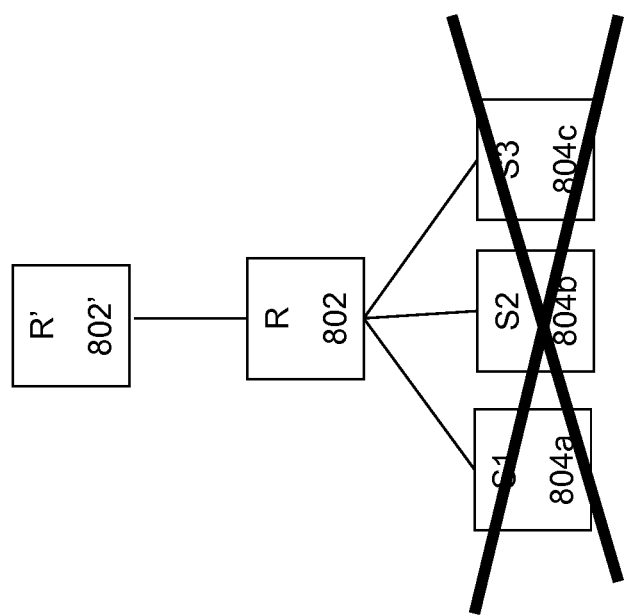
Figure 8E:
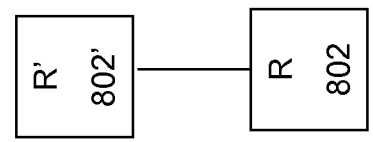
Figure 8F:
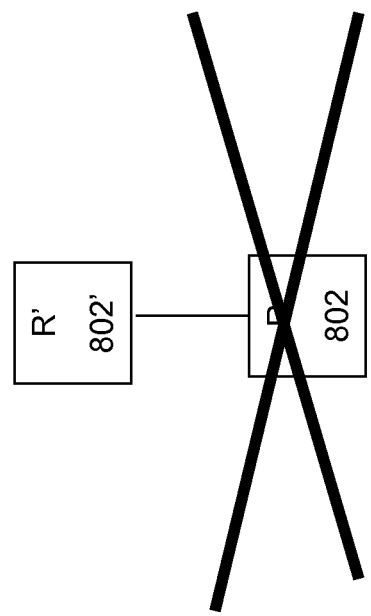

Assume that an update is implemented for the base image to create new base image 802'. At this point, as shown in FIG. 8D, the previously created snapshots 804*a*, 804*b*, and 804*c* need to be invalidated. This is implemented, for example, by revoking the previously granted leases for these snapshots. FIG. 8E illustrates the situation once all of the leases for the local snapshots have been revoked. At this point, the replica of the previous base image can also be removed, as shown in FIG. 8F.

Figure 8G:
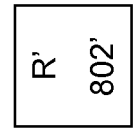
Figure 8H:
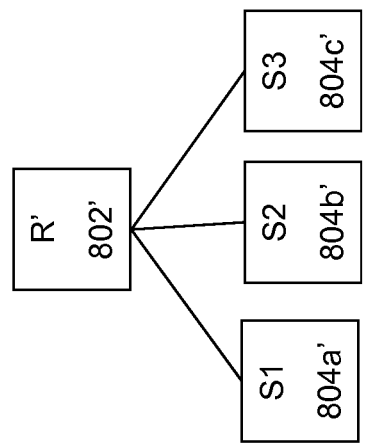

Thereafter, the linked clone implementation only allows linking by the remote nodes to the updated base image 802', as shown in FIG. 8G. Assume that it is desirable to implement the inventive optimization for linked cloning of the base image 802' with local snapshots. As shown in FIG. 8H, new local snapshots 804*a'*, 804*b'*, and 804*c'* can now be created at the remote nodes which correspond to the updated base image 802'.

Therefore, what has been described is an improved approach to implement cloning in a virtualization environment. Each of the remote nodes is allowed to maintain local snapshots of the linked/shared image. The individual snapshots are administered by corresponding nodes that own the snapshots. In this way, the processing power of each remote node (e.g., CPU processing resources) can be used in a decentralized manner to administratively handle access to the shared data, rather than requiring the CPU resources of only the host node to centrally handle administrative access to the data.

This approach solves the problems that can result from cloning approaches that use linking, since the present invention reduces and/or minimizes performance bottlenecks that may result from requiring multiple remote nodes to only employ the resources of the node that hosts the local disk to access the shared image.

In addition, each of nodes can maintain copies of the shared image in a local cache. This allows the caching resources to also be decentralized, as each of the nodes can use its own caching resources to hold the shared data. Also, local caching reduces the need to constantly retrieve the shared data from the linked virtual disk at the host node.

Some embodiments of the invention also provide efficient approaches to permit updates to the base image, even where local snapshots are created to implement linked cloning to access the base image.

Therefore, what has been described is an improved approach to manage shared data in a virtualization environment. It is noted that the solution is applicable to any implementation of shared data, even in the absence of cloning. For example, suppose that there is a virtual disk that is attached directly (without cloning) by multiple VMs. In that case, the current solution can be utilized to permit shared access while minimizing hotspots and bottlenecks—by creating snapshots and administratively using local resources to access the snapshots. This approach permits the shared data to be used directly rather than through a clone (link-based or full clone).

System Architecture

Figure 9:
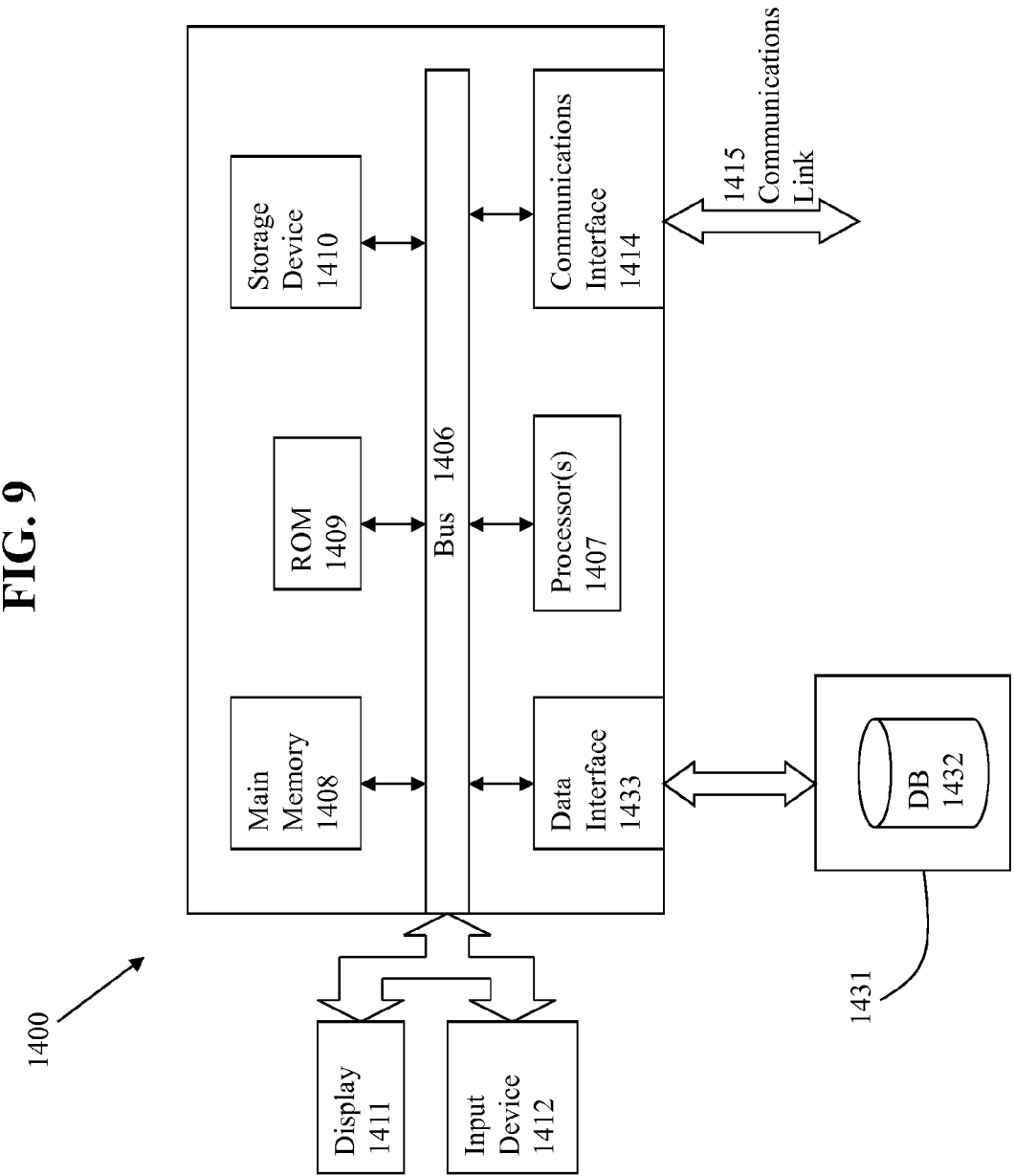
FIG. 9 is a block diagram of a computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing decentralized access to data in a virtualization environment, comprising:
maintaining a virtualization environment that comprises at least a plurality of virtualization nodes, the plurality of virtualization nodes each comprising physical components including at least a processor and one or more storage devices, two or more of the plurality of virtualization nodes each comprising at least a hypervisor and a service virtual machine (SVM) running as a virtual machine above the hypervisor, wherein the SVM manages at least a portion of one of the one or more storage devices as part of a storage pool;
receiving a plurality of requests for access to data from the plurality of virtualization nodes including at least a first virtualization node and a second virtualization node;
identifying the data that corresponds to a virtual disk structured from the one or more storage devices in the storage pool, wherein the data is owned by the first virtualization node of the plurality of virtualization nodes; and
sharing the data with the plurality of virtualization nodes using snapshots by:
creating a first snapshot corresponding to the data at the first virtualization node of the plurality of virtualization nodes and a second snapshot corresponding to the data at the second virtualization node of the plurality of virtualization nodes, the first snapshot and the second snapshot each comprising metadata that points to an actual data of the virtual disk corresponding to the data,
for the second virtualization node that does not own the data, the SVM on the second virtualization node manages access to the data locally using a resource of the second virtualization node to access the second snapshot on the second virtualization node that corresponds to the actual data of the virtual disk, and
for the first virtualization node that does own the data, the SVM on the first virtualization node manages access to the data using a resource of the first virtualization node to access the first snapshot on the first virtualization node that corresponds to the actual data of the virtual disk.

2. The method of claim 1, wherein one or more snapshots are created as part of an optimization process, and wherein the optimization process is performed upon determination that the data is not subject to write operations from the plurality of virtualization nodes and that the data needs to be accessed by a threshold number of the plurality of virtualization nodes.

3. The method of claim 2, wherein the threshold number of the plurality of virtualization nodes comprises at least one virtualization node that is remote to the first virtualization node that owns the data.

4. The method of claim 1, in which managing access to the data further includes using memory resources.

5. The method of claim 1, in which some or all of the data is locally cached at a virtualization node.

6. The method of claim 1, in which the SVM is used to administer access to the data from a user virtual machine (VM).

7. The method of claim 1, in which an update is performed to the data, and further comprising:
receiving the update to the data corresponding to a new version of the data;
invalidating previous snapshots at the virtualization nodes corresponding to a previous version of the data; and
creating new snapshots at the virtualization nodes for the new version of the data.

8. The method of claim 1, wherein sharing the data with the plurality of virtualization nodes using snapshots further comprises:
implementing cloning of the data where linking to the data is established from the plurality of virtualization nodes; and
cloning the data where linking to the data is established from the plurality of virtualization nodes.

9. A computer program product embodied on a non-transitory computer readable medium, the computer readable medium having stored thereon a sequence of instructions which, when executed by a processor causes the processor to execute a method for implementing decentralized access to data in a virtualization environment, comprising:
maintaining a virtualization environment that comprises at least a plurality of virtualization nodes, the plurality of virtualization nodes each comprising physical components including at least a processor and one or more storage devices, two or more of the plurality of virtualization nodes each comprising at least a hypervisor and a service virtual machine (SVM) running as a virtual machine above the hypervisor, wherein the SVM manages at least a portion of one of the one or more storage devices as part of a storage pool;
receiving a plurality of requests for access to data from the plurality of virtualization nodes including at least a first virtualization node and a second virtualization node;
identifying the data that corresponds to a virtual disk structured from the one or more storage devices in the storage pool, wherein the data is owned by the first virtualization node of the plurality of virtualization nodes; and
sharing the data with the plurality of virtualization nodes using snapshots by:
creating a first snapshot corresponding to the data at the first virtualization node of the plurality of virtualization nodes and a second snapshot corresponding to the data at the second virtualization node of the plurality of virtualization nodes, the first snapshot and the second snapshot each comprising metadata that points to an actual data of the virtual disk corresponding to the data,
for the second virtualization node that does not own the data, the SVM on the second virtualization node manages access to the data locally using a resource of the second virtualization node to access the second snapshot on the second virtualization node that corresponds to the actual data of the virtual disk, and
for the first virtualization node that does own the data, the SVM on the first virtualization node manages access to the data using a resource of the first virtualization node to access the first snapshot on the first virtualization node that corresponds to the actual data of the virtual disk.

10. The computer program product of claim 9, wherein one or more snapshots are created as part of a cloning optimization process, and wherein the cloning optimization process is performed upon determination that the data is not subject to write operations from the plurality of virtualization nodes and that the data needs to be accessed by a threshold number of the plurality of virtualization nodes.

11. The computer program product of claim 10, wherein the threshold number of the plurality of virtualization nodes comprises at least one virtualization node that is remote to the first virtualization node that owns the data.

12. The computer program product of claim 9, in which managing access to the data further comprises using memory resources.

13. The computer program product of claim 9, in which some or all of the data is locally cached at a virtualization node.

14. The computer program product of claim 9, in which the SVM is used to administer access to the data from a user virtual machine (VM).

15. The computer program product of claim 9, in which an update is performed to the data, and further comprising:
  receiving the update to the data corresponding to a new version of the data;
  invalidating previous snapshots at the virtualization nodes corresponding to a previous version of the data; and
  creating new snapshots at the virtualization nodes for the new version of the data.

16. A system, comprising:
  a processor;
  a memory comprising computer code executed using the processor, in which the computer code implements a method for implementing decentralized access to data in a virtualization environment, the method comprising:
  maintaining a virtualization environment that comprises at least a plurality of virtualization nodes, the plurality of virtualization nodes each comprising physical components including at least a processor and one or more storage devices, two or more the plurality of virtualization nodes each comprising at least a hypervisor and a service virtual machine (SVM) running as a virtual machine above the hypervisor, wherein the SVM manages at least a portion of one of the one or more storage devices as part of a storage pool;
    receiving a plurality of requests for access to data from the plurality of virtualization nodes including at least a first virtualization node and a second virtualization node;
    identifying the data that corresponds to a virtual disk structured from the one or more storage devices in the storage pool, wherein the data is owned by the first virtualization node of the plurality of virtualization nodes; and
  sharing the data with the plurality of virtualization nodes using snapshots by:
    creating a first snapshot corresponding to the data at the first virtualization node of the plurality of virtualization nodes and a second snapshot corresponding to the data at the second virtualization node of the plurality of virtualization nodes, the first snapshot and the second snapshot each comprising metadata that points to an actual data of the virtual disk corresponding to the data;
    for the second virtualization node that does not own the data, the SVM on the second virtualization node manages access to the data locally using a resource of the second virtualization node to access the second snapshot on the second virtualization node that corresponds to at least the actual data of the virtual disk; and
    for the first virtualization node that does own the data, the SVM on the first virtualization node manages access to the data using a resource of the first virtualization node to access the first snapshot on the first virtualization node that corresponds to the actual data of the virtual disk.

17. The system of claim 16, wherein one or more snapshots are created as part of a cloning optimization process, and wherein the cloning optimization process is performed upon determination that the data is not subject to write operations from the plurality of virtualization nodes and that the data needs to be accessed by a threshold number of the plurality of virtualization nodes.

18. The system of claim 17, wherein the threshold number of the plurality of virtualization nodes comprises at least one virtualization node that is remote to the first virtualization node that owns the data.

19. The system of claim 16, in which access to the data is further managed using at least memory resources.

20. The system of claim 16, in which some or all of the data is locally cached at a virtualization node.

21. The system of claim 16, in which the SVM administers access to the data from a user virtual machine (VM).

* * * * *